United States Patent
Kitai

[15] 3,645,186
[45] Feb. 29, 1972

[54] SHUTTER OPENING AND CLOSING MECHANISM

[72] Inventor: Kiyoshi Kitai, 54, Tomishisa-cho, Shinjaku-ku, Tokyo, Japan

[22] Filed: Dec. 8, 1969

[21] Appl. No.: 883,173

[30] Foreign Application Priority Data

Dec. 9, 1968 Japan....................................43/89715

[52] U.S. Cl. .............................95/59, 95/10 CT, 95/53 EB
[51] Int. Cl..............................................G03b 9/00, G03b 9/62
[58] Field of Search............95/10 CT, 59, 58, 53 EB, 53 EA, 95/53 E

[56] References Cited

UNITED STATES PATENTS

| | | | |
|---|---|---|---|
| 2,571,756 | 10/1951 | Pribus | 95/59 |
| 3,476,031 | 11/1969 | Starp | 95/53 EB |

*Primary Examiner*—Joseph F. Peters, Jr.
*Assistant Examiner*—Russell E. Adams, Jr.
*Attorney*—Robert E. Burns and Emmanuel J. Lobato

[57] ABSTRACT

A camera shutter mechanism comprises a pivotally mounted shutter-operating member which is oscillatable to open and close the lens aperture of the camera. A driving member rotatably mounted on the operating member and spring biased to rotate in one direction has a plurality of arms. A release lever is engageable with one of the arms to hold the driving member in set position when the driving member is released, it is rotated by the spring and one arm acts against an abutment on one side of the axis of the driving member as a fulcrum to moving the operating member in a direction to open the shutter. For longer exposures, the driving member is held in shutter-open position by an electromagnetic magnet controlled by a timing circuit. Upon release by the electromagnet, the driving member rotates further in the same direction but fulcrums about an abutment engaging an arm on the opposite side of the axis of the driving member so that the operating member is pivoted in the opposite direction to close the shutter. Setting means engages an arm of the driving member to cock it while the operating member remains in shutter-closed position.

7 Claims, 4 Drawing Figures

PATENTED FEB 29 1972 3,645,186

SHUTTER OPENING AND CLOSING MECHANISM

The present invention relates to a shutter for a photographic camera and more particularly to an operating mechanism of a shutter having a relative simple opening and closing mechanism.

In the opening and closing operation of a conventional camera shutter, and especially in case of a shutter having a relatively simple opening and closing mechanism, it is difficult to obtain a high-speed exposure because of the inertia of the driving part of the shutter covers the opening window which is given a reciprocating movement in the opening and closing of the SHUTTER. Furthermore, prior art devices for preventing inadvertent opening of the shutter blade while the shutter is being set are generally very complex and expensive.

An object of this invention is to make the driving part of the shutter blade rotate in only one direction and to shift the rotational center thereof so that the shutter blade is made to perform the opening movement as well as the closing movement. Thus, it is an object of the invention to use the inertia of the driving part effectively, so that it becomes possible to obtain a high-speed exposure; moreover, while the driving part is being set, the shutter blade is given a rotational force in its closing direction by which an abnormal opening of the shutter blade is prevented. It is another object of the invention to provide a shutter mechanism which may be combined easily with an electronic shutter control device.

The accompanying drawing illustrates one embodiment of the invention. In such drawing.

DETAILED DESCRIPTION OF THE INVENTION

Figure 1:
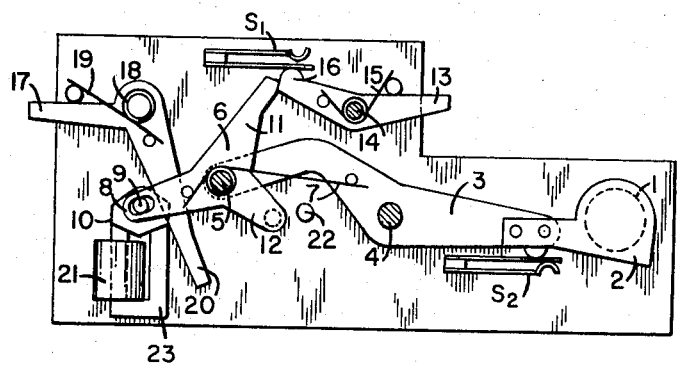
FIG. 1 is a plan view of a mechanism embodying the invention, and showing the shutter in a closed position, set to be triggered.
Figure 2:
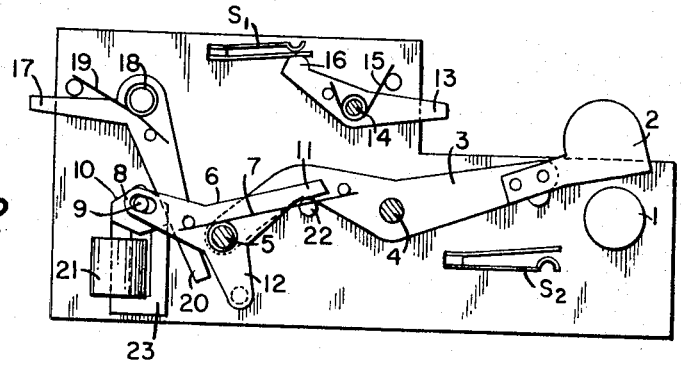
FIG. 2 is a plan view of the mechanism of FIG. 1 after the shutter has been triggered to an open position.
Figure 3:
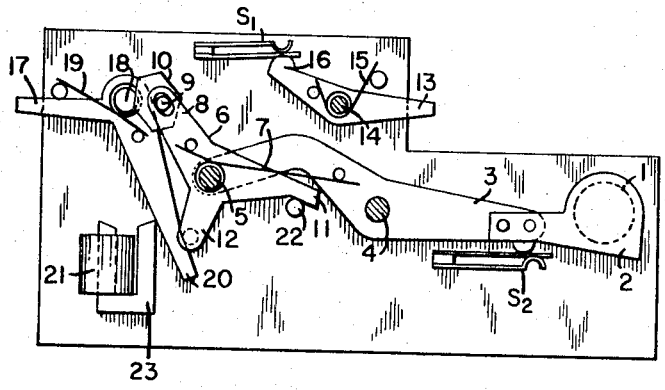
FIG. 3 is a plan view of the mechanism of FIG. 2 after the timing control device and mechanism has reclosed the shutter.

As shown in FIGS. 1-3, a shutter blade 2 for opening and closing the opening window 1, provided in the main body of a shutter, is fixed on one end of an operating member in the form of a lever-shaped part 3 axially mounted for free rotation on a shaft 4. A connecting shaft 5 secured on the other end of the lever 3 has a driving part 6 rotatably held thereon and biased in a direction of clockwise rotation by a spring 7. The driving part 6 is composed of a three-armed lever comprising: a restraining arm 8 having a long slot which receives the shaft 9 of an iron piece 10; a retaining arm 11 for cooperation with a projection 22 on the main body of the shutter; and (the third arm thereof constitutes) a setting arm 12 which cooperates with a setting lever 17. The iron piece 10 is engageable with the core 23 of an electromagnet 21. The interengagement of the stop means or projection 22, the spring 7 and driving lever 6 causes the reciprocating movement of the sector.

A release lever 13 is rotatably mounted on a shaft 14 which is fixed to main body of the shutter, and said lever 13 is urged in a direction of counter clockwise rotation by a spring 15. An operating arm 16, on the lever 13, is engageable with, and disengageable from, the retaining arm 11, and an electric power source switch $S_1$. Thus, when the lever 13 is rotated in the clockwise direction, it releases the retaining arm 11, thereby permitting the driving part 6 to be rotated clockwise under the force of the bias spring 7. As the part 6 rotates, it also carries the shaft 5 downward, causing the shutter blade lever 3 to pivot on its axis 4 and open the shutter. Also, as the lever 13 is rotated to release retaining arm 11, it closes the switch $S_1$. A second switch $S_2$ operable by the lever 3, coacts with switch $S_1$, and is shown in FIG. 4 which is described below.

An operating arm 20 forms a part of a setting lever 17 which is rotatably held on a shaft 18 fixed to the main body of the shutter. The lever 17 is biased toward a clockwise rotation by a spring 19 provided on the shaft 18, and is rotatable to engage the setting arm 12 of the driving part 6, to rotate said part 6 in the counterclockwise direction when the mechanism is to be reset.

Figure 4:
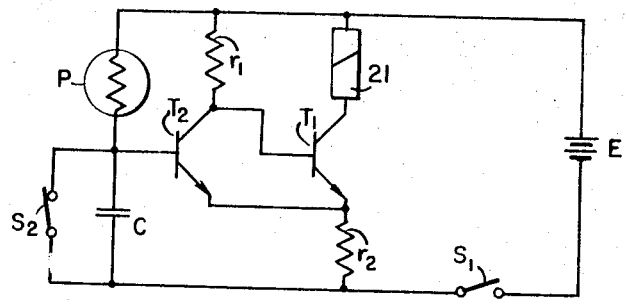
FIG. 4 is a schematic diagram of the timing control device.

The electric power source switch $S_1$ completes the supply circuit of an electric power source E as shown in FIG. 4, said power source E being connected in parallel with a delay circuit composing a photoelectric element P and a capacitor C. In parallel with the condenser C is a short-circuiting circuit that is opened and closed by the switch $S_2$. The positive side of the capacitor C is connected to the base of a transistor $T_2$, the collector of which is connected to the base of another transistor $T_1$. The collector of said transistor $T_1$ draws current through the electromagnet 21. When the lever 13 is triggered, thereby closing the switch $S_1$, a voltage is supplied to the series connected delay circuit so that at first the voltage across the capacitor C is low. At this time, the transistor $T_2$ is held off, and the transistor $T_1$ is conductive to allow an excitation current to flow into the electromagnet 21. When the voltage of capacitor C charges to a specified value, the transistors $T_2$ and $T_1$ are reversed to cut off the excitation current of the electromagnet 21.

The operation of the device described herein is as follows. As shown in FIG. 1 the device is set and ready to be triggered. When the release lever 13 is made to rotate clockwise to actuate the shutter, the operating arm 16 thereof closes the power source switch $S_1$, and at the same time the engagement between the operating arm 16 and the retaining arm 11 of driving part 6 is broken. As the power source switch $S_1$ is closed, the electromagnet 21 is excited to attract the iron piece 10; then the driving part 6 rotates clockwise around the shaft 9; and by the clockwise rotation of the connecting shaft 5, the lever-shaped part 3 is made to rotate counterclockwise around the shaft 4; the timing switch $S_2$ is opened simultaneously to start charging the capacitor C with a current corresponding to the brightness of the photographed body coming to the photoelectric element; and, at the same time, the shutter blade 2 opens the window 1 and the exposure is begun as shown in FIG. 2. Thus, the resistance of the photoelectric element P decreases with an increase in light.

When the charging voltage of capacitor C becomes higher than a specified value, the excitation current of electromagnet 21 is cut off, and the driving part 6 rotates around the connecting shaft 5, under the force of the spring 7. When the retaining arm 11 thereof collides with the projection 22, the movement of the driving part 6 changes to a rotational one of the same direction taking the fulcrum at the projection 22, and in this case, by the clockwise rotation of the connecting shaft 5, the movement of the lever-shaped part 3 changes to a clockwise rotation around the shaft 4 to make the shutter blade 2 close the opening 1. Further, in case of a long time exposure, the retaining lever 11 will already be in engagement with the projection 22, as shown in FIG. 2, so that when the electromagnet 21 sets free the iron piece 10, then the driving part 6 changes its movement directly from the clockwise rotation around the shaft 9 to the rotation of the same direction with a fulcrum at the projection 22.

According to this invention, in either case mentioned above, the driving part 6 utilizes its inertia of rotational motion during the course of opening, and is able to pursue the closing course by the change of rotation center, to make it possible to obtain a high-speed exposure easily, and to automatically close the shutter to the position shown in FIG. 3. In the state when the shutter release has been completed as shown in FIG. 3, the shutter blade 2 is in the position of clockwise rotation to close the opening 1, and the driving part 6 is also in the position of clockwise rotation where its retaining arm 11 has been fitted to the projection 22. In such a state the setting arm 12 of driving part 6 is located very close to the operating arm 20 of setting lever 17. Now, when the setting lever 17 is manually rotated counterclockwise, its operating arm 20 engages the setting arm 12 of driving part 6 to make the arm rotate counterclockwise against the force of spring 7 around the connecting shaft 5, and, at the same time, imparts to the lever-shaped part 3 through the connecting shaft 5 a force to make it rotate clockwise around its shaft 4. Since, however, the lever-shaped part 3 is at the end of its clockwise rotation, the shutter blade 2 stays at rest in closed position. On the other hand, when the driving part 6 is rotated counterclockwise to the position where the iron piece 10 of the restraining arm 8 contacts with the core 23 of the electromagnet 21, the retaining arm 11 is engaged by the operating arm 16 of the release lever 13, so that it is retained at this position to restore the mechanism to the state shown in FIG. 1.

When the shutter is set, a rotational force in the direction of closing the shutter blade is applied, and therefore the device is able to prevent an abnormal opening of shutter blade without providing any additional elements. Furthermore, the installation of the electronic circuit is carried out quite easily.

We claim:

1. In a shutter mechanism, the combination of a shutter blade movable between an open position and a closed position, an operating member for moving said blade between open and closed positions, a driving member rotatably mounted on said operating member and having a plurality of arms, means for rotating said driving member relative to said operating member, a release member engageable with an arm of said driving member to hold it releasably in a set position, retaining means releasably holding an arm of said driving member to provide a first fulcrum about which said driving member turns to move said operating member in shutter-opening direction upon release of said driving member by said release member to rotate in an operating direction, and abutment means engageable by an arm of said driving member to provide a second fulcrum about which said driving member turns to move said operating member in a shutter-closing direction upon further rotation of said driving member in said operating direction.

2. A shutter-operating mechanism according to claim 1, in which said means for rotating said driving member comprises spring means acting between said driving member and said operating member.

3. A shutter-operating mechanism according to claim 1, in which said retaining means comprises an electromagnet.

4. A shutter-operating mechanism according to claim 3, in which an electronic timing circuit controls said electromagnet to release said driving member after a selected interval of time.

5. A shutter-operating mechanism according to claim 4, in which said timing circuit comprises a capacitor and a photoresistor.

6. A shutter-operating mechanism according to claim 2, further comprising setting means engageable with an arm of said driving member to move it to said set position while exerting through said spring means on said operating member a force holding said operating member in shutter-closed position.

7. A shutter-operating mechanism according to claim 6, in which said driving member has three arms.

* * * * *